US010188580B2

(12) United States Patent
Dayal et al.

(10) Patent No.: US 10,188,580 B2
(45) Date of Patent: Jan. 29, 2019

(54) SYSTEMS AND METHODS FOR PROVIDING ENVIRONMENT INFORMATION USING AN UNMANNED VEHICLE

(71) Applicant: Toyota Motor Engineering & Manufacturing North America, Inc., Erlanger, KY (US)

(72) Inventors: Rajiv Dayal, Milpitas, CA (US); Christopher P. Lee, Campbell, CA (US); Allison Thackston, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 214 days.

(21) Appl. No.: 15/150,248

(22) Filed: May 9, 2016

(65) Prior Publication Data

US 2017/0319426 A1 Nov. 9, 2017

(51) Int. Cl.
*A61H 3/06* (2006.01)
*G01C 21/34* (2006.01)
(Continued)

(52) U.S. Cl.
CPC ......... *A61H 3/061* (2013.01); *G01C 21/3476* (2013.01); *G01C 21/3629* (2013.01); *G01C 21/3652* (2013.01); *G01C 21/3679* (2013.01); *G05D 1/0094* (2013.01); *A61H 2003/063* (2013.01); *A61H 2201/5048* (2013.01);
(Continued)

(58) Field of Classification Search
None
See application file for complete search history.

(56) References Cited

U.S. PATENT DOCUMENTS 6,671,226 B1 * 12/2003 Finkel ................ A61H 3/061
367/116
6,975,246 B1 12/2005 Trudeau
(Continued)

OTHER PUBLICATIONS

Avila et al.; "DroneNavigator: Using Drones for Navigating Visually Impaired Persons"; *ASSETS' 15*; 2 pages; Oct. 26-28, 2015.
(Continued)

*Primary Examiner* — Nicholas K Wiltey
(74) *Attorney, Agent, or Firm* — Snell & Wilmer LLP (57) ABSTRACT

A system for providing, to a user, navigation directions to a point of interest. The system includes a device having an output unit configured to output the navigation directions to the point of interest. The device is configured to communicate, to an unmanned vehicle, a point of interest identification. The system also includes the unmanned vehicle having a camera configured to detect image data. The unmanned vehicle is configured to determine whether the point of interest identification is detected from the image data. The unmanned vehicle is also configured to determine a point of interest location when the point of interest identification is detected from the image data. The unmanned vehicle is also configured to determine point of interest navigation data based on the point of interest location. The unmanned vehicle is also configured to communicate, to the device, the point of interest navigation data.

17 Claims, 5 Drawing Sheets

(51) Int. Cl.
*G05D 1/00* (2006.01)
*G01C 21/36* (2006.01)
*H04W 4/02* (2018.01)

(52) U.S. Cl.
CPC ........... *A61H 2201/5058* (2013.01); *A61H 2201/5071* (2013.01); *A61H 2201/5082* (2013.01); *A61H 2201/5089* (2013.01); *A61H 2201/5092* (2013.01); *H04W 4/02* (2013.01)

(56) References Cited

U.S. PATENT DOCUMENTS

| | | | |
|---|---|---|---|
| 8,195,353 B2* | 6/2012 | Ichinose | G01C 22/006 700/245 |
| 8,588,464 B2 | 11/2013 | Albertson et al. | |
| 8,605,141 B2 | 12/2013 | Dialameh et al. | |
| 8,639,396 B1* | 1/2014 | Hirsch | G08G 5/0008 244/76 R |
| 8,930,044 B1* | 1/2015 | Peeters | B64C 19/00 701/2 |
| 8,983,682 B1* | 3/2015 | Peeters | B64C 39/024 244/190 |
| 9,170,117 B1* | 10/2015 | Abuelsaad | G01C 21/34 |
| 9,183,708 B2* | 11/2015 | Daeef | G08B 3/10 |
| 9,213,090 B2 | 12/2015 | Paoletti | |
| 9,229,227 B2 | 1/2016 | Border et al. | |
| 9,302,783 B2* | 4/2016 | Wang | B64F 1/00 |
| 9,452,530 B2* | 9/2016 | Sisbot | G06K 9/00348 |
| 9,508,269 B2* | 11/2016 | Slamka | G01C 21/20 |
| 9,749,780 B2* | 8/2017 | Huang | H04W 4/02 |
| 9,759,917 B2* | 9/2017 | Osterhout | G02B 27/0093 |
| 9,863,776 B2* | 1/2018 | Gordon | G01C 21/3407 |
| 9,875,406 B2* | 1/2018 | Haddick | G06K 9/00604 |
| 2006/0197835 A1* | 9/2006 | Anderson | H04N 7/183 348/117 |
| 2007/0192910 A1* | 8/2007 | Vu | B25J 5/007 700/245 |
| 2009/0021351 A1* | 1/2009 | Beniyama | G05D 1/024 340/10.1 |
| 2009/0055019 A1* | 2/2009 | Stiehl | B25J 9/1671 700/249 |
| 2009/0097710 A1* | 4/2009 | Sroka | G06T 15/20 382/103 |
| 2010/0280699 A1* | 11/2010 | Bageshwar | G05D 1/0231 701/26 |
| 2010/0308999 A1 | 12/2010 | Chornenky | |
| 2012/0271491 A1* | 10/2012 | Spata | G01W 1/00 701/3 |
| 2012/0290152 A1* | 11/2012 | Cheung | G01S 7/003 701/2 |
| 2012/0304085 A1* | 11/2012 | Kim | G08B 13/19671 715/763 |
| 2013/0162632 A1 | 6/2013 | Varga et al. | |
| 2013/0218456 A1 | 8/2013 | Zelek | |
| 2014/0009561 A1* | 1/2014 | Sutherland | B25J 5/007 348/14.05 |
| 2014/0022051 A1* | 1/2014 | Levien | G05D 1/0011 340/5.2 |
| 2014/0024999 A1* | 1/2014 | Levien | G05D 1/00 604/66 |
| 2014/0126822 A1 | 5/2014 | Underwood et al. | |
| 2014/0142851 A1* | 5/2014 | Larmo | G01C 21/3652 701/538 |
| 2014/0267723 A1* | 9/2014 | Davidson, Jr. | H04N 7/183 348/147 |
| 2015/0134143 A1* | 5/2015 | Willenborg | G05D 1/0094 701/2 |
| 2015/0190927 A1* | 7/2015 | Sutherland | B25J 9/1689 700/259 |
| 2016/0029545 A1* | 2/2016 | Matthews | A01B 69/008 701/28 |
| 2016/0059962 A1* | 3/2016 | Abuelsaad | G08G 1/096716 701/3 |
| 2016/0078759 A1* | 3/2016 | Nerayoff | G06Q 20/145 701/3 |
| 2016/0107749 A1* | 4/2016 | Mucci | B64C 39/024 701/3 |
| 2016/0116914 A1* | 4/2016 | Mucci | G05D 1/101 701/2 |
| 2016/0129999 A1* | 5/2016 | Mays | B64C 39/024 701/2 |
| 2016/0180195 A1* | 6/2016 | Martinson | G06K 9/6256 382/103 |
| 2016/0250751 A1* | 9/2016 | Martinson | G06F 19/3406 700/253 |
| 2016/0292872 A1* | 10/2016 | Hammond | G01S 17/66 |
| 2016/0304217 A1* | 10/2016 | Fisher | B60L 11/1809 |
| 2016/0325835 A1* | 11/2016 | Abuelsaad | G08G 1/096716 |
| 2017/0018193 A1* | 1/2017 | Gordon | G08G 5/0069 |
| 2017/0176194 A1* | 6/2017 | Gordon | G01C 21/3407 |
| 2017/0184725 A1* | 6/2017 | Marmet | G01S 19/17 |
| 2017/0255824 A1* | 9/2017 | Miller | G06K 9/00624 |

OTHER PUBLICATIONS

Couch, Christina; "Fitness Technology That Helps the Blind Get Moving"; *MIT Technology Review*; 3 pages; 2016.
Hou, Yip Zheng; "Assistive Guide Robot for Visually Impaired Person"; *Universiti Teknologi Malaysia*; 60 pages; Jun. 2013.
Hunaiti et al.; "A Remote Vision Guidance System for Visually Impaired Pedestrians"; *The Journal of Navigation*; vol. 59; pp. 497-504; 2006.
Theparitt; "Guide Dog-Rotor for Visually Impaired People"; http://marblar.com/idea/4gMo7; 6 pages; 2013.
UAV Air Blog; http://www.uav-air.com/uavair-news; 3 pages; Jan. 29, 2016.

* cited by examiner

SYSTEMS AND METHODS FOR PROVIDING ENVIRONMENT INFORMATION USING AN UNMANNED VEHICLE

BACKGROUND

1. Field

The present disclosure relates to providing information to a device, and more particularly to a system and a method for using an unmanned vehicle to detect and provide environment information to users.

2. Description of the Related Art

Individuals having certain disabilities, such as blindness, may use an aid, such as a cane or service animal to navigate an environment. In addition, individuals may use a navigation device, such as a smartphone with a navigation application, to travel from one location to another. However, these methods may not provide sufficiently detailed and accurate information regarding the environment of the user. For example, a navigation device using Global Positioning System (GPS) technology to determine a location of the user may be used. The navigation device may provide navigation directions to the user based on the location of the user. Locations determined based on GPS technology are subject to a degree of variance. For users who can see, the variance may not be an issue, as the seeing user may simply need to be generally made aware of where and when to turn. However, for a user who is blind, the variance may be too great to reliably depend on for navigation. Thus, there is a need for systems and methods for providing more detailed and more accurate environment information to blind users.

SUMMARY

What is described is a system for providing, to a user, navigation directions to a point of interest. The system includes a device having an output unit configured to output the navigation directions to the point of interest. The device is configured to communicate, to an unmanned vehicle, a point of interest identification. The system also includes the unmanned vehicle having a camera configured to detect image data. The unmanned vehicle is configured to determine whether the point of interest identification is detected from the image data. The unmanned vehicle is also configured to determine a point of interest location when the point of interest identification is detected from the image data. The unmanned vehicle is also configured to determine point of interest navigation data based on the point of interest location. The unmanned vehicle is also configured to communicate, to the device, the point of interest navigation data.

Also described is a device for providing, to a user, navigation directions to a point of interest. The device includes an input unit configured to receive a point of interest identification associated with the point of interest. The device also includes a device camera configured to detect image data. The device also includes a transceiver configured to communicate with an unmanned vehicle. The device also includes a device control unit configured to determine whether the point of interest identification is detected from the image data. The device control unit is also configured to communicate, to the unmanned vehicle, the point of interest identification when the point of interest identification is not detected from the image data. The device control unit is also configured to receive, from the unmanned vehicle, point of interest navigation data. The device also includes an output unit configured to output the navigation directions to the point of interest based on the point of interest navigation data received from the unmanned vehicle.

Also described is a method for providing, to a user, navigation directions to a point of interest. The method includes communicating, by a device to an unmanned vehicle, a point of interest identification. The method also includes detecting, by the unmanned vehicle, image data. The method also includes determining, by the unmanned vehicle, whether the point of interest identification is detected from the image data. The method also includes determining, by the unmanned vehicle, a point of interest location when the point of interest identification is detected from the image data. The method also includes determining, by the unmanned vehicle, point of interest navigation data based on the point of interest location. The method also includes communicating, by the unmanned vehicle to the device, the point of interest navigation data. The method also includes outputting, by the device, the navigation directions to the point of interest based on the point of interest navigation data.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Disclosed herein are systems and methods for providing environment information to a user. As used herein, "environment" may refer to a predetermined amount of area surrounding the user and/or an area within a building or structure the user is inside of. As used herein, "environment information" may refer to navigation directions for guiding a user from a current location to a point of interest, location information of the user, and/or location information of one or more objects within the environment of the user. As used herein, "object" may refer to physical objects, such as trash cans or vending machines, and may also refer to locations, such as stores, parks, buildings, apartments, or houses or restrooms.

The systems and methods provide several benefits and advantages, such as providing more accurate and precise environment information, such that the user may be able to reach a destination or be made better aware of the user's surroundings. The systems and methods described herein may be used by any individual regardless of disability, or lack thereof. However, the benefits and advantages may be more significant for disabled individuals, who may have a harder time locating a destination or anticipating upcoming objects, turns, crowds, dangerous situations or surroundings, etc. These benefits and advantages are achieved by use of a device, such as a wearable device, communicatively connected to an unmanned vehicle, such as an unmanned aerial vehicle. The unmanned vehicle is able to quietly move to locations with vantage points that allow for more accurate and precise environment information to be provided to the user. This is advantageous because a wearable device used to provide information to the user may be located on the body of the user and a camera of the wearable device may not be able to detect sufficient image data for purposes of providing environment information to the user.

For example, a user instructs a wearable device to navigate the user to the nearest coffee shop. The wearable device may be worn on the user's body, such as around the neck, and uses a camera to detect image data used to determine the user's location and navigation directions. For example, the wearable device may use the camera to identify a street sign close to the user or a name of a store close to the user in order to determine the user's location. However, the user may be 4 feet 8 inches tall and in a crowded space with many other people around, so the camera of the wearable device may be unable to detect image data that can be used to determine the user's location. Also, the destination location may be far away or around buildings or shops such that the wearable device cannot view or detect the destination location. The user may also have long hair or is wearing an article of clothing that obstructs the view of the camera. The wearable device communicates with an associated unmanned vehicle, an identification of the coffee shop, which is located around the corner. The unmanned vehicle includes a camera, which detects image data that is sufficient to determine the user's location, and/or the location of the coffee shop, and communicates the navigation data to the wearable device, which outputs navigation directions to the user.

An exemplary system includes a device having an output unit configured to output the navigation directions to the point of interest. The device is configured to communicate, with an unmanned vehicle, a point of interest identification. The system also includes the unmanned vehicle having a camera configured to detect image data. The unmanned vehicle is configured to determine whether the point of interest identification is detected from the image data. The unmanned vehicle is also configured to determine a point of interest location when the point of interest identification is detected from the image data. The unmanned vehicle is also configured to determine point of interest navigation data based on the point of interest location. The unmanned vehicle is also configured to communicate, to the device, the point of interest navigation data.

Figure 1A:
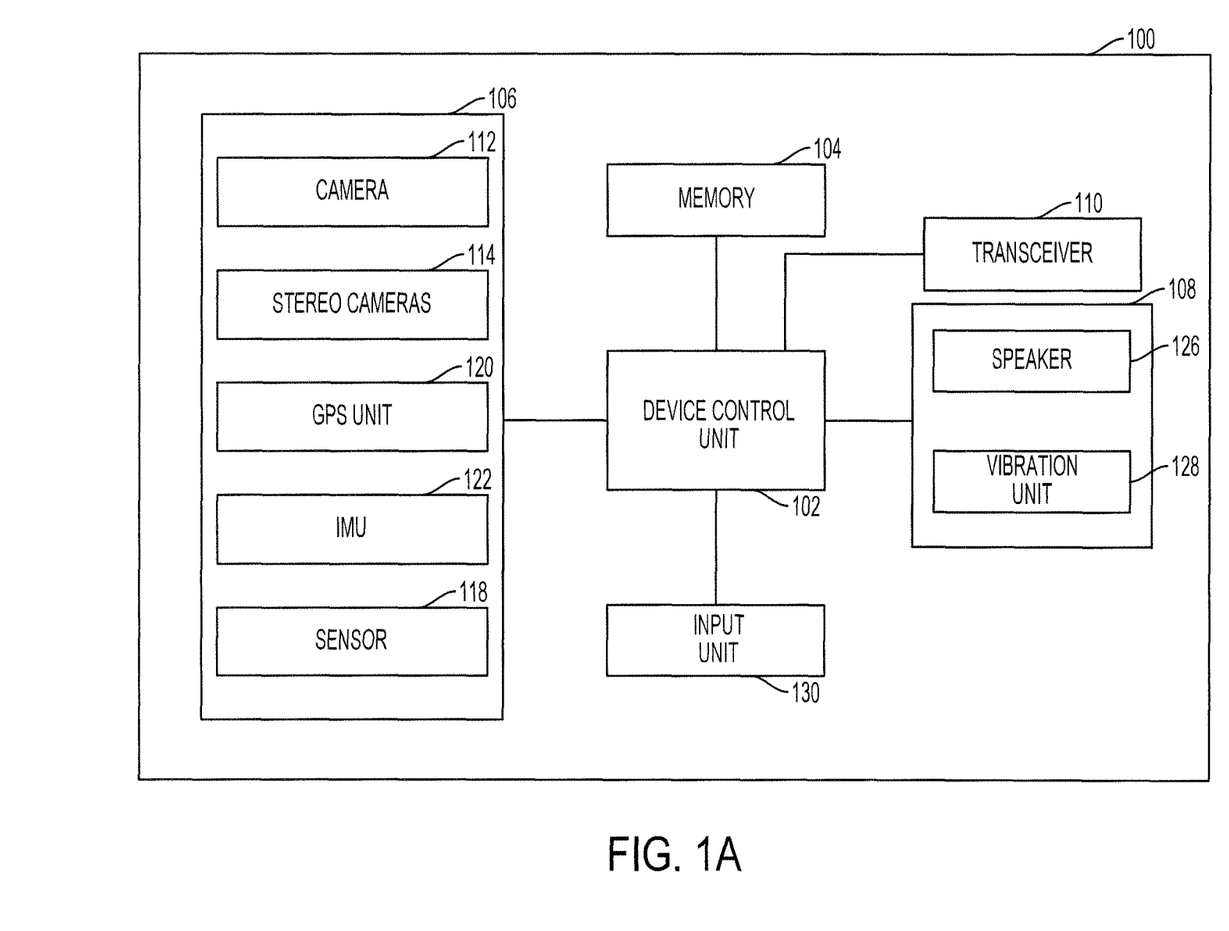
FIG. 1A is a block diagram of components of a device for providing environment information to a user according to an embodiment of the present invention.

FIG. 1A illustrates an exemplary device 100. In some embodiments, the device 100 is a wearable device, such as a device worn around a neck, a smartwatch worn around a wrist, or a headset worn around a head. In some embodiments, the device 100 is a personal mobile device, such as a smartphone or a tablet. The device 100 includes a device control unit 102 connected to a device memory 104, a device sensor array 106, a device output unit 108, a device transceiver 110, and a device input unit 130.

The device control unit 102 may be a computer processor such as an ARM processor, DSP processor, distributed processor, microprocessor, controller, or other processing device. The device control unit 102 may be located in the device 100, may be a remote device control unit or it may be a pairing of a local and a remote device control unit. The device control unit 102 is configured to control the functions of the components of the device 100 that the device control unit 102 is connected to. The device control unit 102 also controls communication with an unmanned vehicle 150 (see also FIG. 1B).

The device memory 104 may be one or any combination of the following: a RAM or other volatile or nonvolatile memory, a non-transitory memory or a data storage device, such as a hard disk drive, a solid state disk drive, a hybrid disk drive or other appropriate data storage. The device memory 104 may further store machine-readable instructions which may be loaded into or stored in the device memory 104 and executed by the device control unit 102. As with the device control unit 102, the device memory 104 may be positioned in the device 100, may be positioned remote from the device 100 or may be a pairing of a local and a remote memory. The device memory 104 may also store information associated with the environment, such as map data.

The device sensor array 106 includes a device camera 112, device stereo cameras 114, a device sensor 118, a device GPS unit 120, and a device inertial measurement unit (IMU) 122. The device stereo cameras 114 may be a stereo camera pair including two cameras offset by a stereo distance, and configured to detect image data to be used by the device control unit 102 for determining a distance to an object. The device stereo cameras 114 may be used instead of or in conjunction with the device camera 112 to detect image data. The device sensor 118 may be one or more sensors which provide further information about the environment in conjunction with the rest of the device sensor array 106 such as one or more of a temperature sensor, an air pressure sensor, a moisture or humidity sensor, a gas detector or other chemical sensor, a sound sensor, a pH sensor, a smoke detector, an altimeter, a depth gauge, a compass, a motion detector, a light sensor, or other sensor. The device GPS unit 120 may be used to determine a geographical location. As is described herein, locations determined using the device GPS unit 120 may not provide enough accuracy to be a basis for providing navigation directions to a visually impaired user, but may be accurate enough to determine a general location, such as a particular mall or a particular office building. The device IMU 122 may include one or more of an accelerometer, a gyroscope, or a magnetometer and is configured to detect and measure linear and angular motion of the device 100.

The device output unit 108 includes a device speaker 126 and a device vibration unit 128. The device speaker 126 may be one or more speakers or other devices capable of producing sounds and/or vibrations. The device vibration unit 128 may be one or more vibration motors or actuators capable of providing haptic and tactile output. The device output unit 108 may provide different outputs based on the abilities or disabilities of the user. For example, when the user is blind, the output unit 108 may provide outputs using the device speaker 126 and/or the device vibration unit 128. In another example, when the user is deaf, the output unit 108 may provide outputs using the device vibration unit 128. In another example, when the user is without disability, the output unit 108 may provide outputs using the device speaker 126 and/or the device vibration unit 128.

The device transceiver 110 can be a receiver and/or a transmitter configured to receive and transmit data from a remote data storage or other device. The device transceiver 110 may include an antenna capable of transmitting and receiving wireless communications. For example, the antenna may be a Bluetooth or Wi-Fi antenna, a cellular radio antenna, a radio frequency identification (RFID) antenna or reader and/or a near field communication (NFC) unit.

The device input unit 130 may be a microphone, a keyboard, a touchpad, or any other device configured to receive an input from a user.

Figure 1B:
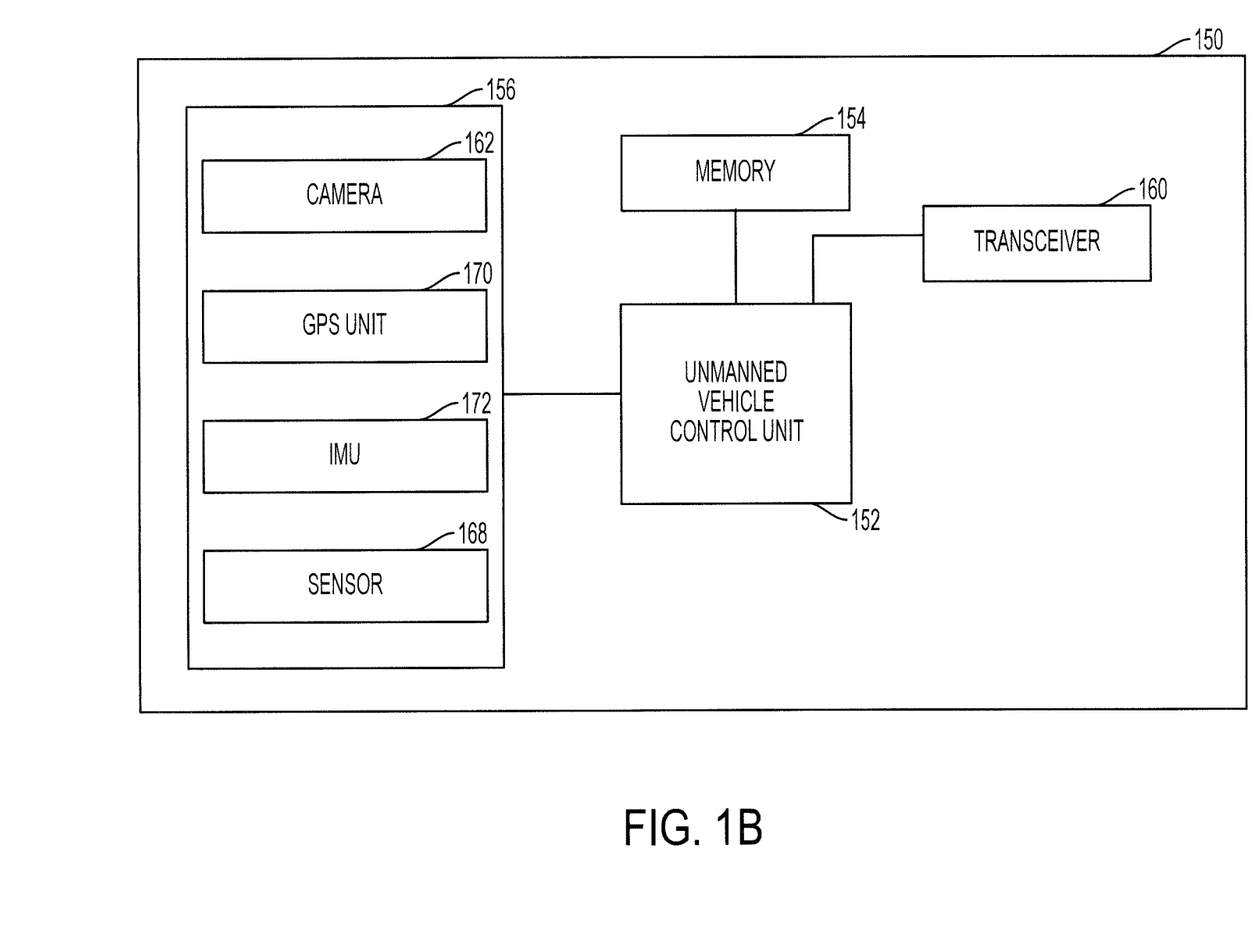
FIG. 1B is a block diagram of components of an unmanned vehicle used with the device for providing environment information to a user according to an embodiment of the present invention.

FIG. 1B illustrates an exemplary unmanned vehicle 150. In some embodiments, the unmanned vehicle 150 is an aerial vehicle with one or more rotary wings (or blades), similar to those used in helicopters or remote-controlled recreational or commercial aerial vehicles, sometimes referred to as "drones." In some embodiments, the unmanned vehicle 150 is a ground-based vehicle with one or more wheels, similar to a car. In yet other embodiments, the unmanned vehicle 150 is ground-based with two or more legs, similar to a robot. The unmanned vehicle 150 includes an unmanned vehicle control unit 152 connected to an unmanned vehicle memory 154, an unmanned vehicle sensor array 156, and an unmanned vehicle transceiver 160.

The unmanned vehicle control unit 152 may be a computer processor such as an ARM processor, DSP processor, distributed processor, microprocessor, controller, or other processing device. The unmanned vehicle control unit 152 may be located in the unmanned vehicle 150, may be a remote processor or it may be a pairing of a local and a remote processor. The unmanned vehicle control unit 152 is configured to control the functions of the components of the unmanned vehicle 150 that the unmanned vehicle control unit 152 is connected to.

The unmanned vehicle memory 154 may be one or any combination of the following: a RAM or other volatile or nonvolatile memory, a non-transitory memory or a data storage device, such as a hard disk drive, a solid state disk drive, a hybrid disk drive or other appropriate data storage. The unmanned vehicle memory 154 may further store machine-readable instructions which may be loaded into or stored in the unmanned vehicle memory 154 and executed by the unmanned vehicle control unit 152. As with the unmanned vehicle control unit 152, the unmanned vehicle memory 154 may be positioned in the unmanned vehicle 150, may be positioned remote from the unmanned vehicle 150 or may be a pairing of a local and a remote memory. The unmanned vehicle memory 154 may also store information associated with the environment, such as map data.

The unmanned vehicle sensor array 156 includes an unmanned vehicle camera 162, an unmanned vehicle sensor 168, an unmanned vehicle GPS unit 170, and an unmanned vehicle IMU 172. While a single unmanned vehicle camera 162 is described herein, any number of multiple unmanned vehicle cameras may be included in the unmanned vehicle sensor array 156. The unmanned vehicle sensor 168 may be one or more sensors which provide further information about the environment in conjunction with the rest of the unmanned vehicle sensor array 156 such as one or more of a temperature sensor, an air pressure sensor, a moisture or humidity sensor, a gas detector or other chemical sensor, a sound sensor, a pH sensor, a smoke detector, an altimeter, a depth gauge, a compass, a motion detector, a light sensor, or other sensor. The unmanned vehicle sensor 168 may also be a sensor configured to determine object location such as radar or lidar and used by the unmanned vehicle 150 in collision avoidance. The unmanned vehicle GPS unit 170 may be used to determine a geographical location of the unmanned vehicle 150. The unmanned vehicle IMU 172 may include one or more of an accelerometer, a gyroscope, or a magnetometer and is configured to detect and measure linear and angular motion of the unmanned vehicle 150.

The unmanned vehicle transceiver 160 can be a receiver and/or a transmitter configured to receive and transmit data from a remote data storage or other device. The unmanned vehicle transceiver 160 may include an antenna capable of transmitting and receiving wireless communications. For example, the antenna may be a Bluetooth or Wi-Fi antenna, a cellular radio antenna, a radio frequency identification (RFID) antenna or reader and/or a near field communication (NFC) unit.

In some embodiments, the unmanned vehicle 150 moves autonomously, without direction from a person or a user. In some embodiments, the movement of the unmanned vehicle 150 is controlled by a person or a user. In these embodiments, the unmanned vehicle 150 receives movement data via unmanned vehicle transceiver 160 and the unmanned vehicle control unit 152 controls the movement of the unmanned vehicle 150 based on the movement data.

Figure 2:
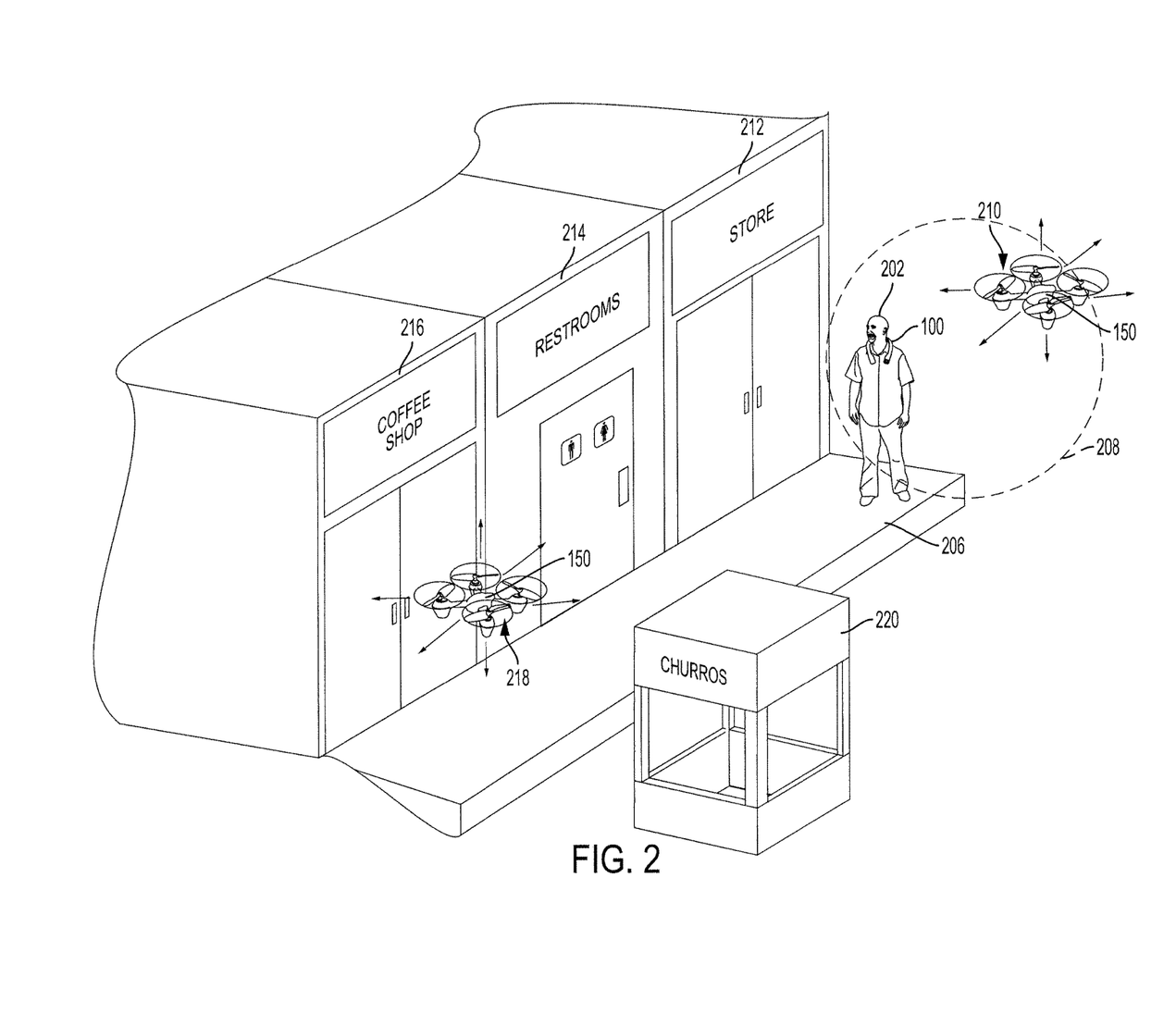
FIG. 2 illustrates an exemplary use of a system for providing environment information to a user according to an embodiment of the present invention.

With reference now to FIG. 2, an exemplary system for providing environment information to a user is illustrated. In FIG. 2, a user 202 of a device 100 is walking along a path 206, such as a sidewalk or a walking area in a building. The device 100 is illustrated as a wearable device resembling a necklace, but other devices, such as a belt, a wearable smart watch or a smartphone may be used. As the user 202 is walking, the device 100, using the device control unit 102, determines a location of the user 202 using a combination of one or more of the sensors in the device sensor array 106 and the device memory 104. For example, the device 100 may determine that the user 202 is located in a particular shopping mall using the device GPS unit 120. The device 100 may then determine a location within the particular shopping mall using image data detected by the device camera 112 and map data stored in the device memory 104 associated with the particular shopping mall. The device control unit 102 may perform image processing on the image data to determine a shop in the vicinity of the device 100 and may determine a specific location based on the stored map data of the shopping mall.

The user 202 may instruct the device 100 to provide navigation directions to a point of interest. The device 100 determines navigation directions to the point of interest based on the determined location of the user 202. For example, if the device 100 determines that the user 202 is currently located inside of a department store and the point of interest is a toy store within the shopping mall, the navigation directions may be to walk straight for 50 feet, turn right, and walk 25 feet, and the toy store will be on the right hand side of the user 202.

However, in some situations, the device 100 may be unable to determine a current location of the user 202. For example, the user 202 may be short and in a crowded area, or the user's 202 hair may be obstructing the view of the device camera 112, or the user 202 may be wearing clothing or a bag that obstructs the view of the device camera 112. In any of these situations, the device 100 may be unable to determine the current location of the user 202. In some situations, the device 100 may be unable to determine the location of the point of interest. For example, if the device 100 determines locations of objects and points of interest based on map data stored in the device memory 104, when the map data is outdated, the device 100 may not be able to determine the location of a current object or point of interest.

In these situations, the device 100 may communicate an identification of the point of interest to the unmanned vehicle 150. As described herein, while FIG. 2 illustrates the unmanned vehicle 150 as being an unmanned aerial vehicle with rotating blades located above the user 202, the unmanned vehicle 150 may be an unmanned terrestrial vehicle with wheels resembling a car, or with legs resembling a robot. As shown in FIG. 2 by the arrows surrounding the unmanned vehicle 150, the unmanned vehicle 150 is capable of moving in any direction in three dimensions.

Upon receiving the point of interest identification, the unmanned vehicle 150 may determine a location of the user 202, determine a location of the point of interest, determine navigation data, and communicate the navigation data to the device 100 so that navigation directions may be provided to the user 202, such as "Keep walking for 25 feet and then make a right hand turn."

Alternatively, instead of communicating a request for navigation directions, the device 100 may communicate, to the unmanned vehicle 150, a mapping request. The mapping request may be a general request for location data associated with one or more objects or points of interest in the environment, such as when the user 202 is in an unfamiliar place. Upon determining location data associated with all objects or points of interest in the environment, the user 202 may be provided with environment information by the device 100 as the user 202 travels, such as "Coffee shop approaching to your right in 15 feet."

The unmanned vehicle 150 may be located within a communication range 208 of the device 100 (e.g., within 100 feet in radius), so that the unmanned vehicle 150 and the device 100 may continuously communicate data using the device transceiver 110 and the unmanned vehicle transceiver 160. The unmanned vehicle 150 and the device 100 may also communicate via a remote cloud based server. The device 100 may communicate data to the remote cloud based server and the unmanned vehicle 150 may retrieve the data from the remote cloud based server. Accordingly, the unmanned vehicle 150 may communicate data to the remote cloud based server and the device 100 may retrieve the data from the remote cloud based server.

Upon receiving either the point of interest identification or the mapping request, the unmanned vehicle 150 may determine an information collecting location. The information collecting location may be an initial location the unmanned vehicle 150 moves to upon receiving the point of interest identification or the mapping request. The unmanned vehicle control unit 152 may determine the information collecting location based on map data stored in the unmanned vehicle memory 154. The map data may indicate previously stored information collecting locations. In some embodiments, when a particular information collecting location provides a good vantage point, the particular information collecting location may be stored as part of the map data. The vantage points associated with the information collecting locations may be judged based on the number of objects that can be included in the image data detected at the information collecting location. The vantage points associated with the information collecting locations may also be judged based on the number of obstructions, or lack thereof, between the unmanned vehicle camera 162 and an object. The stored information collecting location may include a latitude, a longitude and an elevation. The unmanned vehicle 150 may include an altimeter as the sensor 168 in the unmanned vehicle sensor array 156 in order to detect elevation.

The unmanned vehicle 150 automatically moves to the information collecting location and detects the image data. If the point of interest identification is not detected based on the image data detected at the information collecting location, the unmanned vehicle 150 may adjust the information collecting location and again detect the image data. For example, when the unmanned vehicle 150 is an unmanned aerial vehicle, the unmanned aerial vehicle may fly to as high of an elevation as possible and detect image data using the unmanned vehicle camera 162. If the point of interest identification cannot be detected based on the detected image data, the unmanned aerial vehicle may adjust by moving slightly lower, slightly forward, or to a different area entirely. In some embodiments, the unmanned vehicle sensor 168 is a radar, a lidar, or other sensor in the unmanned vehicle sensor array 156 capable of determining when the unmanned vehicle 150 is close to another object, in order to avoid making contact with the other object.

Whether the point of interest identification is detected by the image data may be determined by the device 100 or by the unmanned vehicle 150. When the device 100 is responsible for determining whether the point of interest identification is detected by the image data, the unmanned vehicle 150 communicates the detected image data to the device 100 via the unmanned vehicle transceiver 160 and the device transceiver 110. When the unmanned vehicle 150 is responsible for determining whether the point of interest identification is detected by the image data, the unmanned vehicle 150 determines a point of interest location and communicates navigation data determined based on the point of interest location, to the device 100. The device 100 may use the device control unit 102 and the unmanned vehicle 150 may use the unmanned vehicle control unit 152 to determine whether the point of interest identification is detected by the image data. Either the device control unit 102 or the unmanned vehicle control unit 152 may perform image processing on the image data to detect the point of interest identification. For example, the point of interest identification may be a name of a store and the image data may include the name of the store. In another example, the point of interest identification may be a type of store, and the image data may include the name of a store. The type of store may be determined by the device control unit 102 or the unmanned vehicle control unit 152 based on a comparison of a stored list of stores and store types. The stored list may be stored in the device memory 104 and/or unmanned vehicle memory 154.

In some embodiments, a remote cloud based server determines whether the point of interest identification is detected by the image data. In these embodiments, the unmanned vehicle 150 communicates the detected image data to the remote cloud based server using the unmanned vehicle transceiver 160, and the remote cloud based server performs the image processing. When the point of interest identification is detected from the image data, the device 100 retrieves or receives the location or navigation data from the remote cloud based server using the device transceiver 110.

In some situations, the information collecting location is outside the communication range 208 of the device 100 and the unmanned vehicle 150 moves outside the communication range 208 in order to detect the image data. Once the unmanned vehicle 150 has detected the point of interest identification from the image data, the unmanned vehicle 150 returns to a communication location within the communication range 208 of the device 100 to communicate the location or navigation data to the device 100. In some embodiments, the unmanned vehicle 150 uses the unmanned vehicle GPS unit 170 to determine generally where the device 100 was located, in order to return to the communication range 208 of the device 100. In some embodiments, the unmanned vehicle 150 stores the movement of the unmanned vehicle 150 in the unmanned vehicle memory 154 and reverses the order of movement in order to return to the communication range 208 of the device 100. In some embodiments, the device 100 communicates its location to the unmanned vehicle 150 via a remote cloud based server, as described herein.

In an example embodiment, as shown in FIG. 2, the user 202 may indicate to the device 100 via the device input unit 130, to navigate the user 202 to the nearest coffee shop 216. As described herein, the user 202 may be blind and unable to visually locate the nearest coffee shop 216. Also as described herein, the user 202 may be able to see, but may be unable to visually locate the nearest coffee shop 216 due to any number of reasons, such as a crowd of people being around the user 202 or the user 202 being distracted or preoccupied with another matter. If the device 100 is unable to locate the coffee shop 216 using the device sensor array 106, the device 100 communicates a request to the unmanned vehicle 150 for location data or navigation data associated with the coffee shop 216.

The unmanned vehicle 150 located at an information collecting location 210 detects image data using the unmanned vehicle camera 162 and the unmanned vehicle control unit 152 determines whether a coffee shop is detected by the image data. In this example embodiment, when the unmanned vehicle 150 is located at the information collecting location 210, the image data detected by the unmanned vehicle 150 may provide the identification of the store 212 and the restroom 214, but not the coffee shop 216.

The unmanned vehicle 150 may determine an adjusted information collecting location 218 to move to in order to determine the location of the coffee shop 216. In some embodiments, the information collecting location is adjusted to be a higher location than before. In some embodiments, the information collecting location is initially determined and adjusted based on map data and is a location central to multiple objects in the environment. In some embodiments, the information collecting location is initially determined and adjusted based on a searching algorithm, such as a breadth first search, a depth first search, or any other algorithm suitable for searching in an organized manner.

In the example embodiment, the unmanned vehicle control unit 152 determines an adjusted information collecting location 218 using map data stored in the unmanned vehicle memory 154. The map data indicates that the coffee shop 216 is located next to the restroom 214, which has been identified. Accordingly, the unmanned vehicle 150 moves to adjusted information collecting location 218, which is near the restroom 214. The unmanned vehicle 150 detects image data, and identifies the coffee shop 216 based on the image data. The unmanned vehicle 150 determines the location of the coffee shop 216 using any combination of sensors in the unmanned user sensor array 156. The unmanned vehicle 150 may also detect an orientation of the user 202 so that when the unmanned vehicle 150 provides the coffee shop navigation data to the device 100, the device 100 is able to provide appropriate navigation directions to the user 202. For example, if the user 202 was initially facing away from the coffee shop 216, the first instruction in the navigation directions determined by the unmanned vehicle 150 would be for the user 202 to turn around.

The orientation of the user 202 may be determined by the device IMU 122 and communicated to the unmanned vehicle 150. The orientation of the user 202 may be determined by the unmanned vehicle 150 based on the image data of the user 202 detected by the unmanned vehicle camera 162.

The unmanned vehicle 150 may be continuously located within the communication range 208 of the device 100 and provide feedback data to the device 100 to assist in navigating the user 202 to the desired destination or point of interest. The unmanned vehicle 150 may use the unmanned vehicle camera 162 to detect the image data of the user 202 and any objects in the way of the user 202. The unmanned vehicle 150 may further use the unmanned vehicle control unit 152 to determine whether the user 202 is imminently going to make contact with an object or to determine whether the user 202 is straying from a route. For example, if the user 202 begins to veer to the user's 202 left hand side, or if the user 202 is about to run into a bench or other obstacle, the unmanned vehicle 150 provides feedback data to the device 100 regarding the user 202. The feedback data provided by the unmanned vehicle 150 may be used in addition to or in lieu of a collision avoidance system of the device 100 using one or more device sensors in the device sensor array 106.

In another example embodiment, the user 202 may smell a sweet, delicious aroma of churros, but the user 202 may not know where to get churros. The user 202 may instruct the device 100 to navigate the user 202 to a churro vendor, if there is one in the area. The device 100 may be unable to locate a churro vendor based on stored map data in the device memory 104. The device 100 communicates, to the unmanned vehicle 150, a point of interest identification of "churro vendor." The unmanned vehicle 150 may also be initially unable to locate a churro vendor based on stored map data in the unmanned vehicle memory 154, which may be the same map data stored in the device memory 104. The unmanned vehicle 150 searches for a churro vendor.

When the unmanned vehicle 150 searches for the point of interest identification, the unmanned vehicle 150 determines an information collecting location. In some embodiments, the information collecting location is determined based on the map data. In some embodiments, the unmanned vehicle 150, using the unmanned vehicle control unit 152, determines a list of information collecting locations where the point of interest may be located. For example, the map data may indicate a first location of a food court and may also indicate a second location of multiple food vendor kiosks. The unmanned vehicle 150, using the unmanned vehicle control unit 152, may recognize that a churro is a type of food and determine that the information collecting location should first be located in the food court and then be adjusted to be located in the area of food vendor kiosks. While the unmanned vehicle 150 traverses the environment to detect the churro vendor, the device 100 may provide an output to the user 202 using the device output unit 108 that the unmanned vehicle 150 is currently searching for the location requested. At this point, the user 202 may cancel the request.

The unmanned vehicle 150 may continuously detect image data at various locations until either the point of interest identification is detected or the search is stopped. In some embodiments, the search is stopped by the user 202 communicating an indication to stop, into the device input unit 130. In some embodiments, the unmanned vehicle 150 searches until a predetermined amount of time has passed, at which point the search is stopped. In some embodiments, the unmanned vehicle 150 stops searching when the unmanned vehicle 150 determines that all objects in the environment have been located and the requested location is not one of the determined objects in the environment.

The unmanned vehicle 150 may receive, from the device 100, user instruction data associated with instructions or requests from the user 202 via the device input unit 130. The unmanned vehicle 150 may communicate with the device 100 when the unmanned vehicle 150 is within the communication range 208. The unmanned vehicle 150 may also communicate with the device 100 when the unmanned vehicle 150 is outside of the communication range 208. In some embodiments, the device 100 communicates data to be communicated to the unmanned vehicle 150, to a remote server, such as a cloud based server. The unmanned vehicle 150 also communicates with the remote server to receive the data from the device 100. The unmanned vehicle 150 and the device 100 may communicate with the remote server using their respective transceivers over a cellular network or a wireless local area network, for example.

The unmanned vehicle 150 may communicate with one or more other unmanned vehicles using the unmanned vehicle transceiver 160 and environment information may be shared between the unmanned vehicles. In some embodiments, multiple unmanned vehicles are positioned throughout an environment and the device 100 is able to connect to an unmanned vehicle based on proximity and receive environment and location information from the unmanned vehicle. In this case, the unmanned vehicles are not tied to a user 202 or a device 100, but are tied to a location.

When the unmanned vehicle 150 detects the churro vendor 220, the unmanned vehicle 150 determines the location of the churro vendor 220. The unmanned vehicle 150 then determines navigation data based on the location of the churro vendor 220 and moves within the communication range 208 to communicate the navigation data associated with the churro vendor 220 to the device 100. The device 100 outputs the navigation directions using the device output unit 108. In an example embodiment, the device speaker 126 audibly instructs the user 202 navigation directions to get to the churro vendor 220. In another example embodiment, the device vibration unit 128 generates a series of vibrations of varying lengths and/or intensities to communicate the navigation directions to the user 202. The navigation directions may be in terms of a standard unit of measure, such as feet, yards, inches, or meters, or may be a personalized unit of measure, such as steps of the user measured based on stride length of the user. The unmanned vehicle 150 may detect changes in the user's distance between steps by using the image data detected by the unmanned vehicle camera 162 and may adjust the navigation directions accordingly.

As described herein, instead of requesting navigation directions to a point of interest, the user 202 may communicate a mapping request for environment information associated with an environment. In an example embodiment, the user 202 is inside of a shopping mall that the user 202 is unfamiliar with. The user 202 may communicate to the device 100, via the device input unit 130, a mapping request. The device 100 may access map data associated with the shopping mall in order to provide environment information to the user 202. In some embodiments, the map data is stored in the device memory 104. In some embodiments, the device 100, using the device control unit 102 and the device transceiver 110 which is capable of obtaining data via wireless local area network connection or cellular network connection, receives the map data from a remote server.

In some situations, the map data may be unavailable to the device 100. In these situations, the device 100 may communicate, to the unmanned vehicle 150 within communication range 208 of the device 100, a request for location data associated with one or more objects in the environment of the user 202.

Upon receiving the request for location data associated with one or more objects in the environment, the unmanned vehicle 150 automatically moves to various information collecting locations and detects image data to determine location data associated with one or more objects in the environment. In some embodiments, the unmanned vehicle 150 continuously detects the image data using the unmanned vehicle camera 162. In some embodiments, the unmanned vehicle 150 detects the image data periodically based on time, periodically based on distance travelled, or periodically each time the unmanned vehicle 150 is still, or not moving.

The unmanned vehicle 150 may return to a communications location within the communication range 208 of the device 100 to communicate, to the device 100, the determined location data associated with the one or more objects in the environment. The device 100, using the determined location data, may provide environment information to the user 202 regarding objects around the user 202. For example, as shown in FIG. 2, as the user 202 walks past store 212, the device 100 may output, using the device output unit 108, an indication that the user 202 is in front of the store 212 and that the user 202 is approaching the restroom 214. The location data associated with the one or more objects in the environment may be in the form of a list with an object identifier and location specific location, such as coordinates. The location data associated with the one or more objects in the environment may be in the form of map data to be stored in the device memory 104, indicating an object identifier and a location on the map data.

Figure 3:
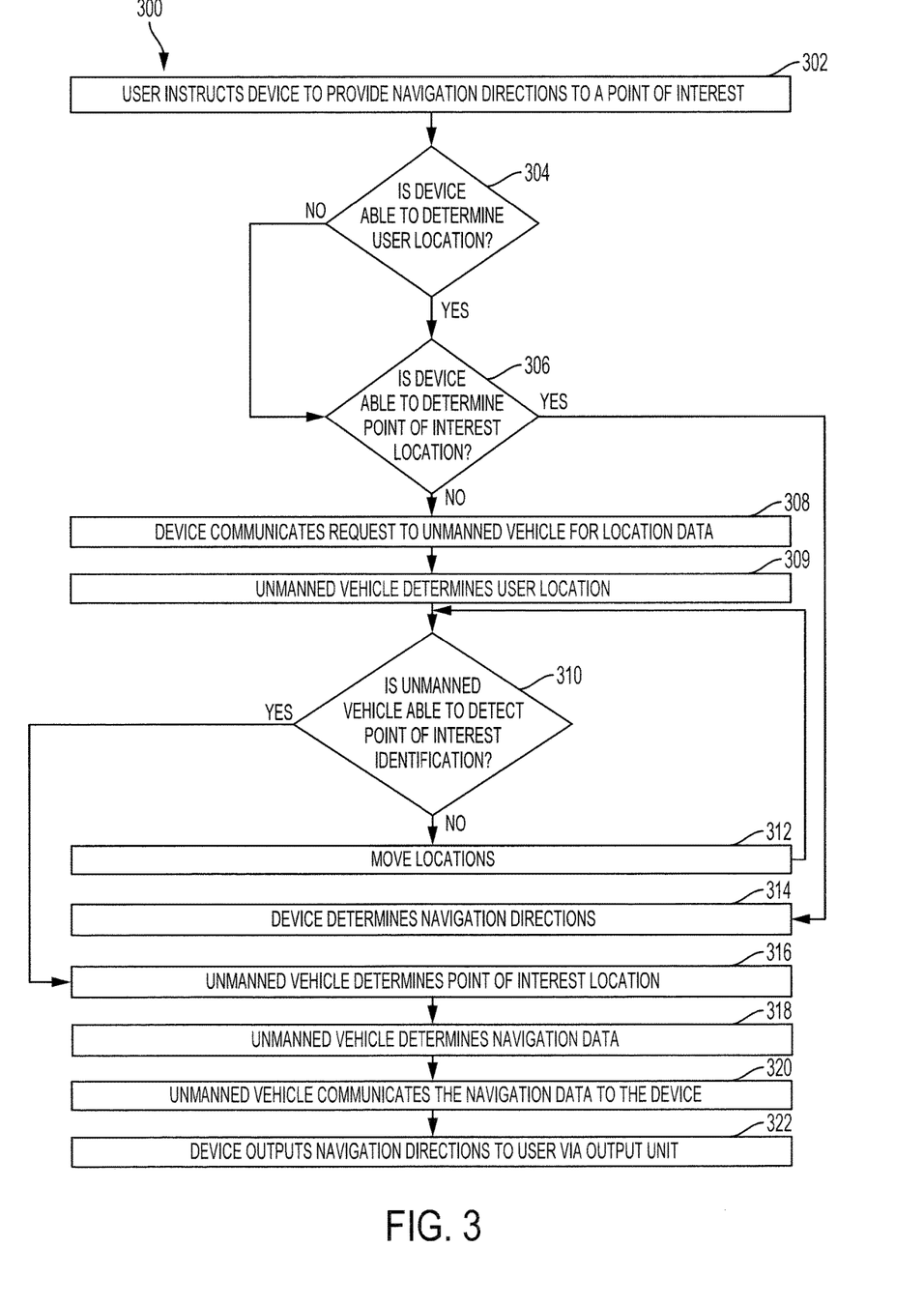
FIG. 3 illustrates a method for providing navigation directions to a point of interest using the system according to an embodiment of the present invention.

With reference now to FIG. 3, a method 300 may be used by a device and an unmanned vehicle such as the device 100 and the unmanned vehicle 150 for providing navigation directions to a user. As described herein, the user 202 may be a blind user, a user capable of sight, or a user having any other disability or lack thereof.

A user 202 instructs the device 100 to provide navigation directions to a point of interest (step 302). The user 202 may instruct the device 100 via the device input unit 130, which may be a microphone, keyboard, or touchscreen device.

The device 100 determines if it is able to determine the user's location (step 304). In some embodiments, the device control unit 102 determines whether the user's 202 location is able to be determined. The user's 202 location may be determined using one or more of the sensors in the device sensor array 106, such as the device camera 112. For example, the device camera 112 detects image data, which may include a street sign and a store name, which the device control unit 102 uses to determine a location of the device 100.

The device 100 determines whether it is able to determine the location of the point of interest (step 306). In some embodiments, the device control unit 102 determines whether the point of interest location is able to be determined. The point of interest location may be determined using one or more sensors in the device sensor array 106, such as the device camera 112, or map data stored in the device memory 104 may be used to determine the location of the point of interest. For example, if the point of interest is a museum, the device camera 112 detects image data, including the museum name, which the device control unit 102 uses to determine the location of the museum. The device memory 104 may also store map data indicating the location of the museum, which the device control unit 102 may access.

When the device 100 is able to determine the user's 202 location and the point of interest location, the device 100 determines navigation directions (step 314) and the device 100 outputs the navigation directions to the user 202 via the device output unit 108 (step 322). The device 100 may determine the navigation directions using the device control unit 102 and the device 100 may output the navigation directions to the user 202 using, for example, the device speaker 126 to audibly instruct the user 202.

When the device 100 is unable to determine the user's location or is unable to determine the point of interest location, the device 100 communicates a request to the unmanned vehicle 150 for navigation data (step 308). The request may include an identification of the point of interest and may also include the user location, if it is able to be determined by the device 100. In some embodiments, the device 100 communicates the request to the unmanned vehicle 150 using the device transceiver 110. The device 100 may communicate, to the user 202 using the output unit 108 that the unmanned vehicle 150 used to determine navigation directions. In some embodiments, the user 202 may be able to indicate to the device 100, using the input unit 130, to not use the unmanned vehicle 150 to assist in determining navigation directions. In some embodiments, the user 202 may store as a user preference when the unmanned vehicle 150 should be used, where the unmanned vehicle 150 should be used, or in what situations the unmanned vehicle 150 should be used.

The unmanned vehicle 150 receives the request via the unmanned vehicle transceiver 160. The unmanned vehicle 150 includes an unmanned vehicle camera 162 configured to detect image data. The image data may be detected continuously, at a predetermined frequency, or each time the unmanned vehicle 150 is still.

The unmanned vehicle 150 determines a location of the user 202 based on image data (step 309). The unmanned vehicle 150 may determine the location of the user 202 using the unmanned vehicle control unit 152 and may also use map data or GPS data from the unmanned vehicle GPS unit 170 to determine the location of the user 202.

The unmanned vehicle control unit 152 determines whether the point of interest identification is detected from the image data (step 310). When the unmanned vehicle 150 is unable to detect the point of interest identification from the image data, the unmanned vehicle 150 automatically moves locations (step 312). The unmanned vehicle 150 may move to a higher elevation, to a more central location, to a particular location previously identified as having a good vantage point, or to a location based on performing a search algorithm. For example, if the map data is stored in the unmanned vehicle memory 154, the unmanned vehicle 150 may perform a search algorithm by traversing locations based on the map data and collecting detected image data.

When the unmanned vehicle 150 detects the point of interest identification from the image data, the unmanned vehicle determines a location of the point of interest (step 316). The unmanned vehicle 150 may determine the point of interest location using the unmanned vehicle control unit 152 and may also use map data or GPS data from the unmanned vehicle GPS unit 170 to determine the point of interest location.

The unmanned vehicle 150 determines point of interest navigation data using the determined user location and the point of interest location (step 318) and communicates the point of interest navigation data to the device 100 (step 320). The device 100 outputs the navigation directions to the user 202 using the device output unit 108 (step 322).

Figure 4:
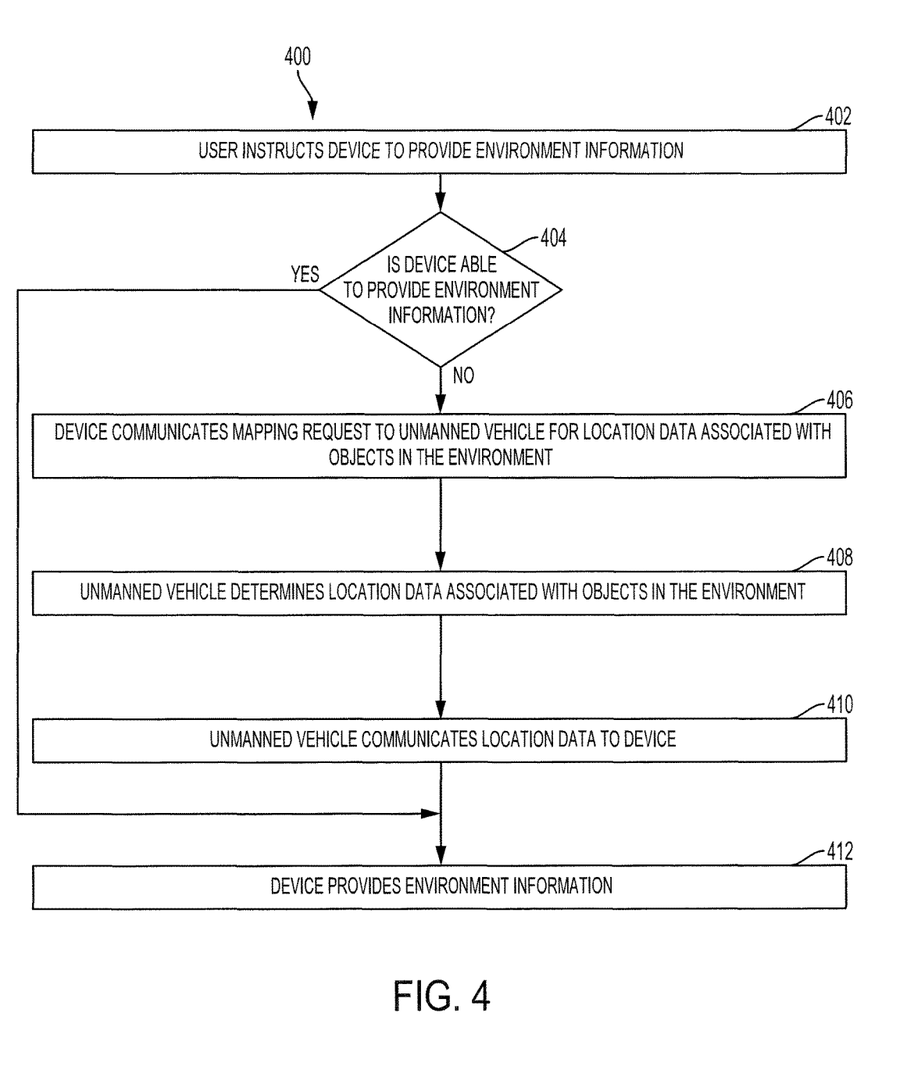
FIG. 4 illustrates a method for providing environment information to a user according to an embodiment of the present invention.

With reference now to FIG. 4, a method 400 may be used by a device and an unmanned vehicle such as the device 100 and the unmanned vehicle 150 for providing environment information to a user.

The user 202 instructs the device 100 to provide environment information (step 402). As described herein, the user 202 may instruct the device 100 using the device input unit 130 and the environment information may include location data associated with objects in the environment of the user 202. The device 100 may use the determined environment information in providing a description of objects around the user 202 as the user 202 travels within the environment. The device 100 may also use the determined environment information in providing navigation directions to a user 202 at a later time.

The device 100 determines whether it is able to provide environment information (step 404). In some embodiments, the device control unit 102 determines whether the device 100 is able to provide environment information. Environment information may be determined by the device control unit 102 using image data detected by the device camera 112. The environment information may also be determined by the device control unit 102 using the map data stored in the device memory 104. When the environment information is able to be provided by the device 100, the device 100 provides the environment information to the user 202 (step 412).

When the device 100 is unable to provide the environment information to the user 202, the device 100 communicates a mapping request to the unmanned vehicle 150 for location data associated with objects in the environment (step 406).

The unmanned vehicle 150 receives the request for location data associated with objects in the environment and the unmanned vehicle 150 determines location data associated with the objects in the environment (step 408). In some embodiments, the unmanned vehicle 150 is configured to detect objects using one or more sensors in the unmanned vehicle sensor array 156, such as the unmanned vehicle camera 162 or a radar sensor. The unmanned vehicle 150 may move from object to object or location to location in order to detect location data associated with the objects in the environment. The unmanned vehicle 150 may also use map data stored in the unmanned vehicle memory 154 to determine where to move to. The unmanned vehicle 150 may determine location data of objects in a systematic manner. For example, the unmanned vehicle 150 may determine location data of buildings and structure first, and then determine location data of physical objects such as trash cans and benches. The unmanned vehicle 150 may determine the location data of objects based on proximity to the user 202. That is, the locations of objects closest to the user 202 may be determined before the locations of objects farther away from the user 202.

In some embodiments, the unmanned vehicle 150 determines location data for a predetermined threshold number of objects in the environment. In some embodiments, the unmanned vehicle 150 determines location data of objects in the environment for a predetermined amount of time. The unmanned vehicle 150 communicates the determined location data of the objects in the environment to the device 100 (step 410). The unmanned vehicle 150 may communicate the determined location data of the objects in the environment periodically or at one time, upon conclusion. The unmanned vehicle 150 may move outside the communication range of the device 100 to an information collecting location in order to detect the image data used to determine the location data. In these situations, the unmanned vehicle 150 may move back to a communications location within the communication range of the device 100 to communicate the location data.

The device 100 provides the general environment information to the user 202 using the device output unit 108, as described herein (step 412).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for providing, to a user, navigation directions to a destination at a destination location, the system comprising:
    a device worn around a neck of the user and configured to receive an identification of the destination from the user, search for the destination location, and communicate, to an unmanned vehicle, the identification of the destination when the device is unable to determine the destination location; and
    the unmanned vehicle for determining the destination location when the device is unable to determine the destination location, the unmanned vehicle having a camera configured to detect image data, and being configured to:
        determine an information collecting location,
        automatically move to the information collecting location,
        detect the image data at the information collecting location,
        determine whether the destination is detected from the image data at the information collecting location,
        determine the destination location when the destination is detected from the image data at the information collecting location, and
        communicate, to the device, the destination location,
    wherein the device is further configured to determine and output the navigation directions to guide the user from a current location of the user to the destination location.

2. The system of claim 1, wherein the unmanned vehicle is further configured to adjust the information collecting location when the destination location is not determined based on the image data.

3. The system of claim 1, wherein the unmanned vehicle includes a memory comprising map data and the information collecting location is determined based on the map data.

4. The system of claim 3, wherein the map data includes a plurality of stored information collecting locations, each having a latitude, a longitude, and an elevation where the unmanned vehicle has previously detected image data used to determine the destination location.

5. The system of claim 1, wherein the information collecting location is within a communication range of the device.

6. The system of claim 1, wherein the unmanned vehicle is further configured to automatically move within a communication range of the device to communicate the destination location when the information collecting location is outside the communication range of the device.

7. The system of claim 1, wherein the unmanned vehicle is an unmanned aerial vehicle.

8. The system of claim 1, wherein the unmanned vehicle is further configured to determine an orientation of the user and wherein the destination location is relative to the orientation of the user.

9. A device for providing, to a user, navigation directions to a destination at a destination location, the device comprising:
    an input unit configured to receive a destination identification associated with the destination;
    a device camera configured to detect image data;
    a transceiver configured to communicate with an unmanned vehicle;
    a device control unit configured to:
        determine whether the destination is detected from the image data,
        communicate, to the unmanned vehicle, the destination identification when the destination is not detected from the image data, and
        receive, from the unmanned vehicle, the destination location, the unmanned vehicle configured to determine an information collecting location, automatically move to the information collecting location, and determine the destination location based on detected image data at the information collecting location; and
    an output unit configured to output the navigation directions to the destination based on the destination location received from the unmanned vehicle.

10. The device of claim 9, wherein the device is a wearable device worn by the user.

11. The device of claim 9, wherein the output unit is further configured to output an indication that the unmanned vehicle is being used to determine the navigation directions when the destination is not detected from the image data.

12. The device of claim 9, wherein the unmanned vehicle is within a communication range of the device.

13. A method for providing, to a user, navigation directions to a destination at a destination location, the method comprising:
    receiving, by a device worn around a neck of the user, an identification of the destination from the user;
    searching, by the device, for the destination location;
    communicating, by a device to an unmanned vehicle, the identification of the destination when the device is unable to determine the destination location;
    determining, by the unmanned vehicle, an information collecting location;
    detecting, by the unmanned vehicle, image data at the information collecting location;
    determining, by the unmanned vehicle, whether the destination is detected from the image data at the information collecting location;
    determining, by the unmanned vehicle, the destination location when the destination is detected from the image data at the information collecting location;
    communicating, by the unmanned vehicle to the device, the destination location; and
    outputting, by the device, the navigation directions to the destination based on the destination location received from the unmanned vehicle.

14. The method of claim 13, further comprising adjusting, by the unmanned vehicle, the information collecting location to detect additional image data when the destination location is not determined based on the image data.

15. The method of claim 13, further comprising determining, by the unmanned vehicle, the information collecting location based on map data stored in an unmanned vehicle memory.

16. The method of claim 15, wherein the map data includes a plurality of stored information collecting locations, each having a latitude, a longitude, and an elevation where the unmanned vehicle has previously detected image data used to determine the destination location.

17. The method of claim 13, further comprising automatically moving, by the unmanned vehicle, within a communication range of the device to communicate the destination location when the information collecting location is outside the communication range of the device.

* * * * *